United States Patent [19]

Joyce et al.

[11] 4,305,134
[45] Dec. 8, 1981

[54] AUTOMATIC OPERAND LENGTH CONTROL OF THE RESULT OF A SCIENTIFIC ARITHMETIC OPERATION

[75] Inventors: Thomas F. Joyce, Burlington; Richard A. Lemay, Carlisle; William E. Woods, Natick, all of Mass.

[73] Assignee: Honeywell Information Systems Inc., Waltham, Mass.

[21] Appl. No.: 92,619

[22] Filed: Nov. 8, 1979

[51] Int. Cl.³ .............................................. G06F 7/48
[52] U.S. Cl. .................................... 364/748; 364/745
[58] Field of Search ......................... 364/745, 748, 749

[56] References Cited

U.S. PATENT DOCUMENTS

| 3,434,114 | 3/1969 | Arulpragasam et al. | 364/748 X |
| 3,569,685 | 3/1971 | Chesley | 364/745 |
| 3,871,578 | 3/1975 | Van De Goor et al. | 364/748 |

*Primary Examiner*—Jerry Smith
*Attorney, Agent, or Firm*—George Grayson; Nicholas Prasinos; Ronald T. Reiling

[57] ABSTRACT

Mantissa results of floating point operations are truncated to words of 24 bits each by storing the 64 bit mantissa result in a first address location of a random access memory, and storing binary ZEROs in the 48 least significant bit positions of a second address location of the random access memory. The mantissa result is truncated by addressing the high order 24 bits at the first address location and the 48 binary ZEROs at the second address location.

6 Claims, 10 Drawing Figures

RAMAM 30

| | 0 | 23 | 24 | 55 |
|---|---|---|---|---|
| | ACC3UA | | ACC3LA | 7 SA3 |
| | ACC2UA | | ACC2LA | 6 SA2 |
| | ACC1UA | | ACC1LA | 5 SA1 |
| | MEMUA | | MEMLA | 4 MEM OPERAND |
| 3 | 0 | | 0 | |
| 2 | 0 | | 0 | |
| 1 | 0 | | 0 | |
| 0 | 0 | | 0 | |

RAMBM 32

| | 0 | 23 | 24 | 55 | 56 | 63 |
|---|---|---|---|---|---|---|
| | ACC3UB | | ACC3LB | | $G_1 G_2$ | 7 |
| | ACC2UB | | ACC2LB | | $G_1 G_2$ | 6 |
| | ACC1UB | | ACC1LB | | $G_1 G_2$ | 5 |
| | MEMUB | | MEMLB | | $G_1 G_2$ | 4 |
| 3 | 0 | | 0 | | | |
| 2 | 0 | | 0 | | | |
| 1 | 0 | | 0 | | | |
| 0 | 0 | | 0 | | | |

FIG. 6

REGM4 68

| 0 | 1 | 2 | 3 | 4 | 5 | 6 | 7 |
|---|---|---|---|---|---|---|---|
| R/T | | ML1 | AL1 | ML2 | AL2 | ML3 | AL3 |
| | | \_SA1\_ | | \_SA2\_ | | \_SA3\_ | |

FIG. 5

R/T = ROUND TRUNCATE
   0 = TRUNCATE
   1 = ROUND

ML = MEMORY LENGTH
   0 = 2 WORDS
   1 = 4 WORDS

AL = ACCUMULATOR LENGTH
   0 = 2 WORDS
   1 = 4 WORDS

AUTOMATIC OPERAND LENGTH CONTROL OF THE RESULT OF A SCIENTIFIC ARITHMETIC OPERATION

RELATED APPLICATIONS

1. "Apparatus for Performing the Scientific ADD Instruction", invented by Thomas F. Joyce, Richard A. Lemay, William E. Woods and Richard P. Brown, Ser. No. 93,096, filed on Nov. 8, 1979 and assigned to the same assignee as named herein.

2. "A Hexadecimal Digit Shifter Output Control by a Programmable Read Only Memory", invented by Thomas F. Joyce and David E. Cushing, Ser. No. 92,810, filed on Nov. 9, 1979 and assigned to the same assignee as named herein.

3. "Automatic Rounding of Floating Point Operands", invented by Thomas F. Joyce, Ser. No. 92,907, filed on Nov. 9, 1979 and assigned to the same assignee as named herein.

BACKGROUND OF THE INVENTION

1. Field of Use

This invention relates generally to scientific instruction processors and more specifically to the truncation of the results of scientific arithmetic operations.

2. Description of the Prior Art

The operands in floating point arithmetic operations include a mantissa, a mantissa sign, and an exponent which locates the decimal point. The mantissa is usually a fractional number that is normalized with the decimal point assumed to the left of the most significant digit of the operand. The most significant digit may be a binary, octal, hexadecimal, etc., digit. The exponent, therefore, is a measure of the number of digit positions to move the decimal point from the left-most position.

During the arithmetic processing of operands, some scientific instructions shift one operand relative to the other. For example, during the processing of a scientific ADD instruction, one operand is shifted in order to equalize the two operands; that is, the exponents are made equal. The length of the result, therefore, is limited only by the length of the scientific accumulators. However, in scientific processing it may not be desirable to store the entire result due to memory limitations. In that case, the mantissa of the result is truncated after normalization. A truncated result may be two words long, four words long, or however long the system requires.

Prior art systems, particularly firmware controlled systems, use a number of firmware steps to generate a truncated result. The steps include generating a mask of binary ONEs and ZEROs, and ANDing the mask with the result of the scientific arithmetic operation. The Honeywell Level 6/40 is a typical example using this approach.

Another technique is to align operands through the use of switches by enabling the portions of the switches associated with the high order bit positions of the result. The switches are controlled by special shifter circuits. Such an approach is described in the system disclosed in U.S. Application Ser. No. 000,391 entitled "Pointer for Defining the Data by Controlling Merge Switches" filed Jan. 2, 1979 and now U.S. Pat. No. 4,224,682.

These approaches, however, have the disadvantage of being too slow or too costly.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

Accordingly, it is a primary object of the invention to provide a scientific instruction processor with improved apparatus for truncating the results of a floating point arithmetic operation.

It is another object of the invention to provide a scientific instruction processor which improves the speed of the truncation operation.

It is still another object of the invention to provide a scientific instruction processor which reduces the hardware complexity for performing the truncation operation.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 5 shows the layout of the REGM4 register defining the length of the operands.

FIG. 6 shows the layout of the address locations for the random access memories storing the mantissas of the operands.

SUMMARY OF THE INVENTION

Figure 1:
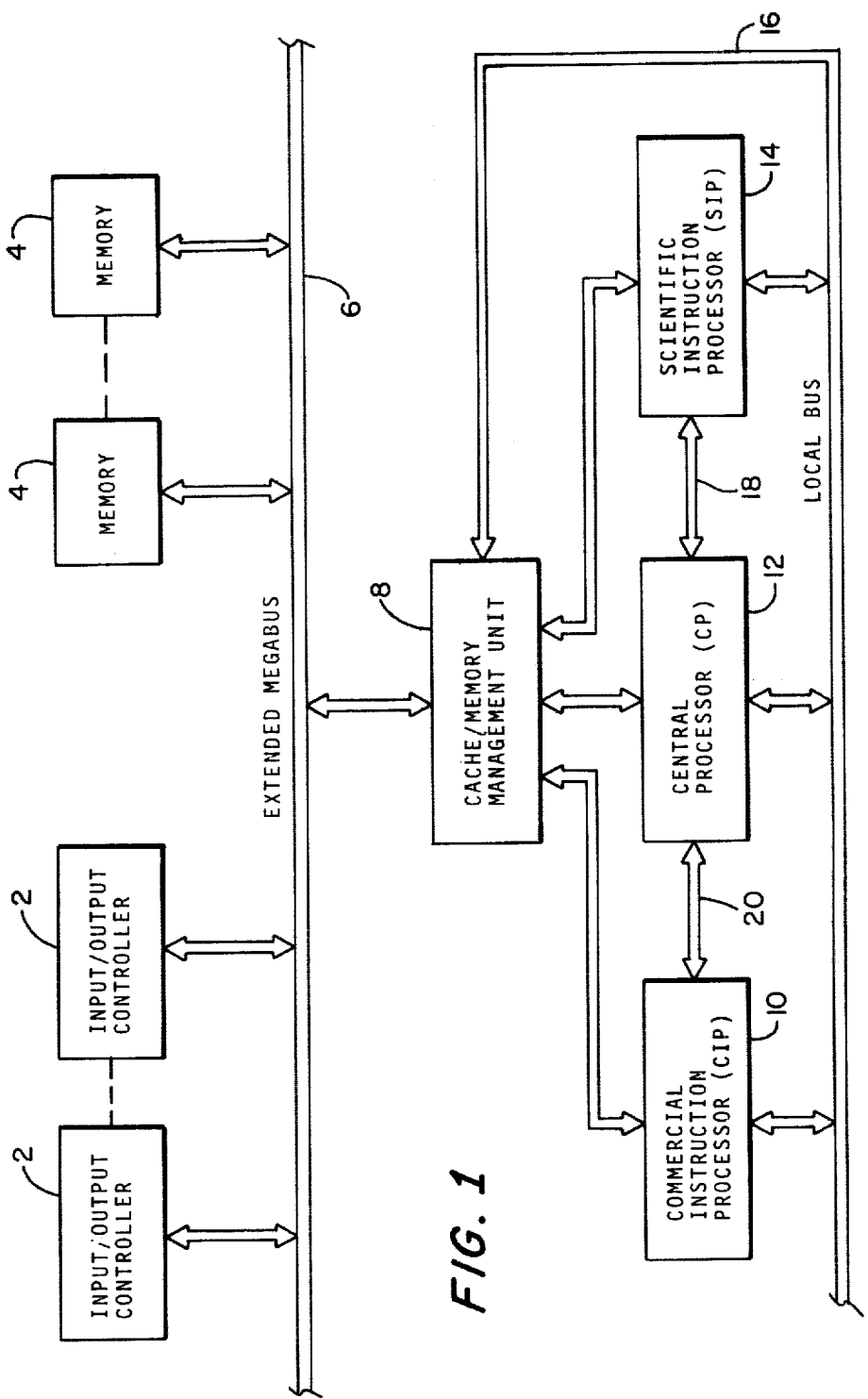
FIG. 1 is the overall block diagram of the system.

The scientific instruction processor stores floating point mantissas in a 56 bit by 16 address location random access memory (RAM), and a 64 bit by 16 address location random access memory (RAM). Each random access memory has a plurality of address locations designated as scientific accumulators for storing the results of scientific arithmetic operations and another address location for storing memory operands.

Associated with each scientific accumulator and the memory location is an address location having a 4 bit address differing from the 4 bit address of the scientific accumulators and the memory location by 1 bit position, and containing binary ZEROs in the low order bit positions.

Operands transferring through the system are either two word operands or four word operands as defined by the contents of the register REGM4 68.

In a typical system, address locations 5, 6 and 7 of both the 56 and 64 bit RAMs are designated as scientific accumulators 1, 2 and 3 respectively. Address locations 4 of both RAMs are designated as memory operand locations.

The RAMs are also organized with address locations 0 through 3 of the 56 bit RAM containing binary ZEROs in bit positions 24 through 55 and address locations 0 through 3 of the 64 bit RAM containing binary ZEROs in bit positions 24 through 63.

When the contents of register REGM4 68 call for a two word result, addressing logic will select RAM bit positions 0 through 23 of address locations 5, 6 or 7, and bit positions 24 through 56 or 24 through 63 of the locations 1, 2 or 3 of the selected RAM. Not that the corresponding address locations differ by the 4 bit in address bits.

When the contents of register REGM4 68 call for a four word result, the high order 56 mantissa bits of the scientific accumulator 1, 2 or 3 are read from the selected RAM.

DESCRIPTION OF THE PREFERRED EMBODIMENT

FIG. 1 shows a block diagram of the overall system in which the present invention may be incorporated which includes a plurality of input/output controllers 2 and a plurality of memory modules 4 coupled in common to an extended bus 6. Also coupled to bus 6 is a cache/memory management unit 8.

The system further includes a central processor (CP) 12, a commercial instruction processor (CIP) 10, and a scientific instruction processor (SIP) 14 coupled in common to a local bus 16 and also coupled to the cache/memory management unit 8, which is also coupled to bus 16. The SIP 14 and CP 12 are coupled by a CP-SIP bus 18. CP 12 and the CIP 10 are also coupled by a CP-CIP bus 20.

The functions of the input/output controllers 2 and memory 4 are well known in the art and will be described only as they relate to the invention. The CP 12 receives information in the form of computer instructions from cach/memory management unit 8. The SIP 14 executes scientific instructions received by CP 12, which include floating point instructions. The CIP 10 executes instructions received by the CP 12 to facilitate the processing of character strings and decimal data.

This invention improves the performance of the truncation operation. The scientific ADD instruction is used in this embodiment as a means for describing the truncation operation.

A floating point operand can be 32 bits or 64 bits in length including a 7 bit exponent, a 1 bit matissa sign, and either a 24 or 56 bit mantissa. The exponent is in excess 64 form with the range of value from −64 to +63. The mantissa is negative when the sign bit is at logical ONE and positive when the sign bit is at logical ZERO. The mantissa is a fractional number with the hexadecimal point to the left of the high order bit of the mantissa.

The scientific ADD instruction adds the contents of the effective address (EA) in memory 4 to the contents of a scientific accumulator in SIP 14, and the result is stored in the accumulator. For the purposes of discussion, operand # is stored in scientific accumulator # (SA#) and operand N is stored in th EA.

The scientific ADD therefore performs the operation of (SA#)←(SA#)+(EA) where () indicates "the contents of".

Figure 2:
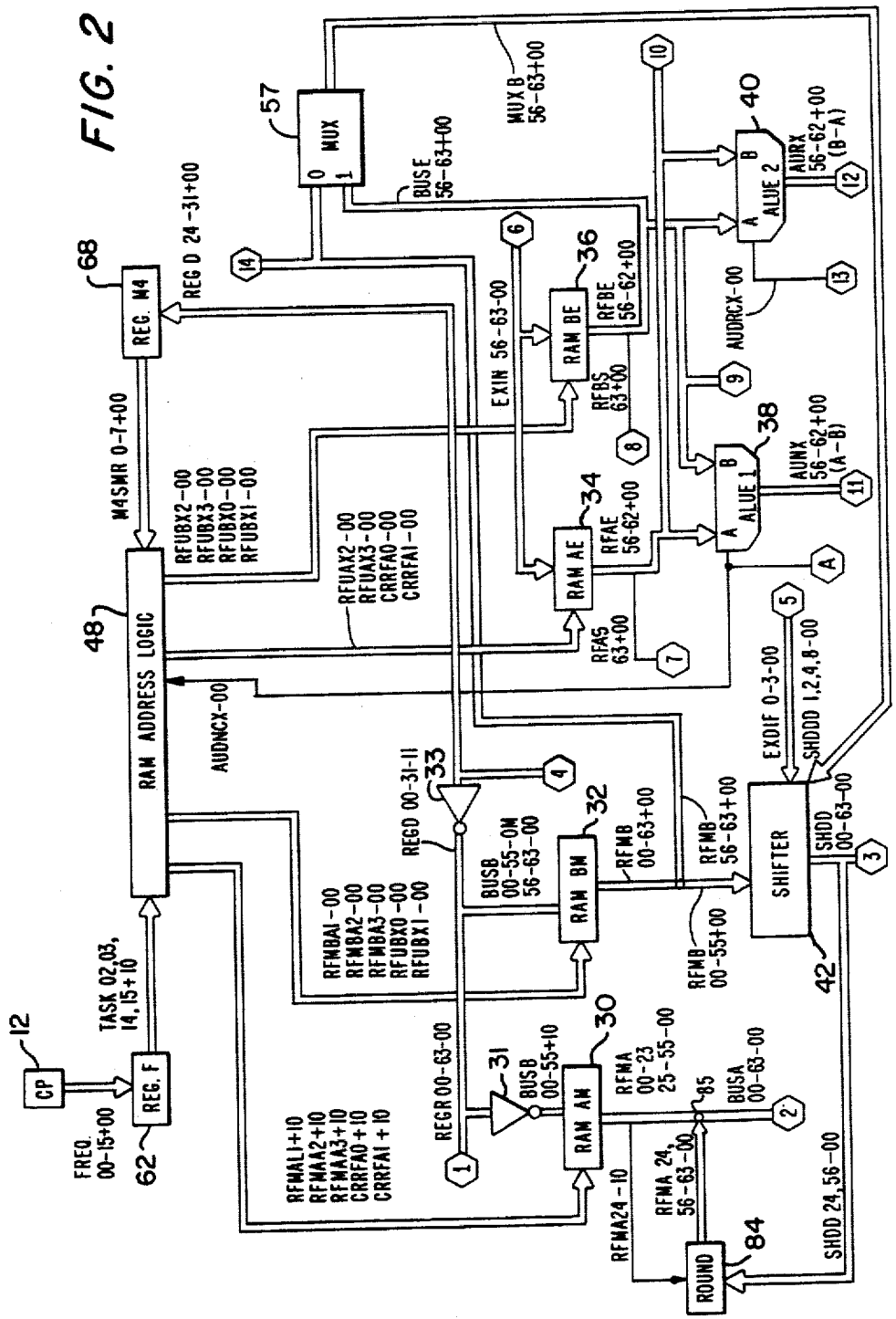
FIG. 2 is an overall block diagram of the scientific instruction processor.
Figure 2:
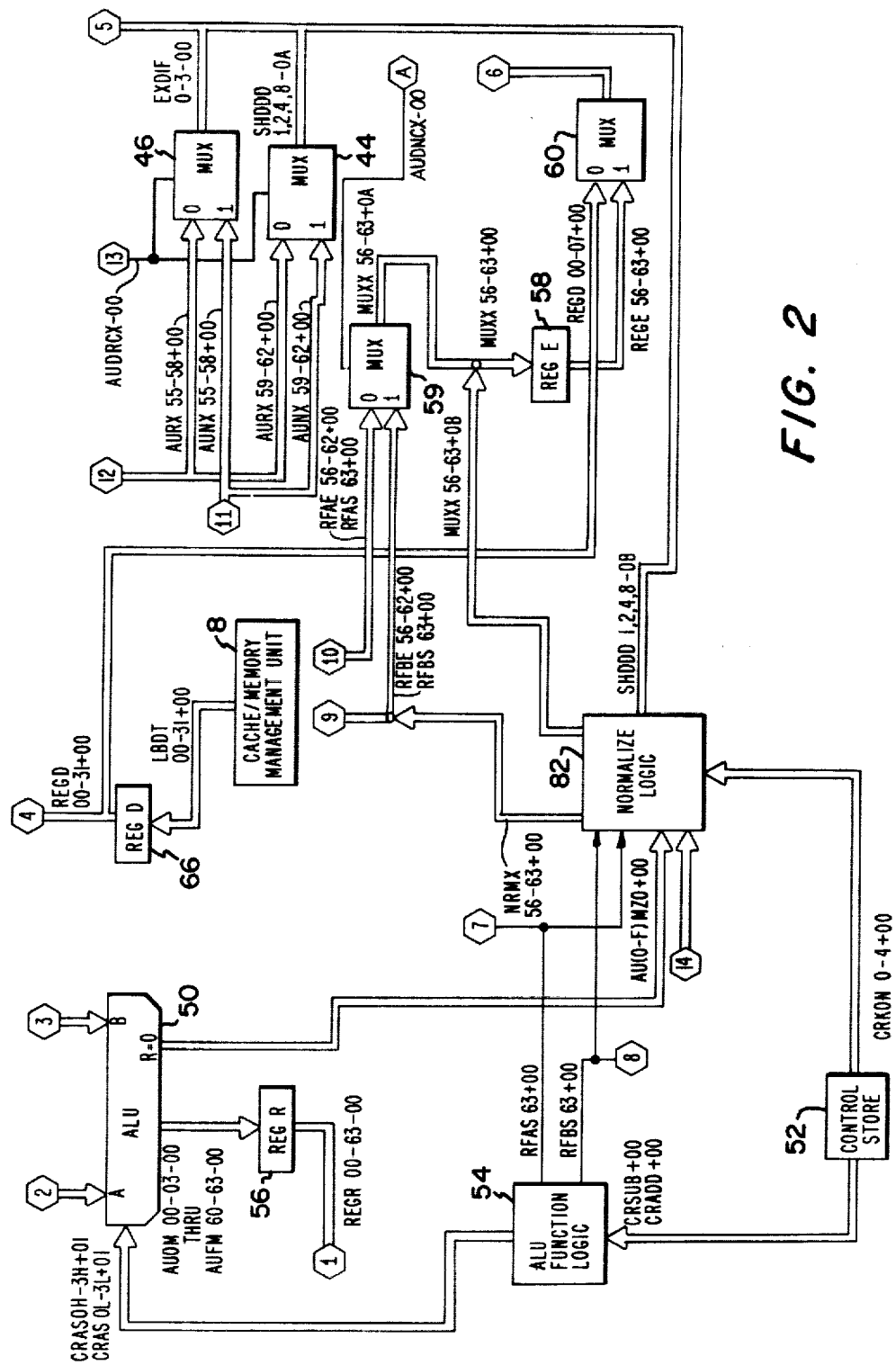

FIG. 2 shows an overall block diagram of the SIP 14. RAMAM 30 is a 56 bit by 16 address location random access memory (RAM) and stores the mantissa of operand # and operand N. It comprises 14 74S189 circuits. Three address locations are set aside as scientific accumulators. One of the scientific accumulators is assigned by the SIP 14 logic as SA# and a second scientific accumulator which stores the (EA) is assigned as SAN.

RAMBM 32 is a 64 bit by 16 address location random access memory and stores the mantissa of operand # in SA# and the mantissa of operand N in SAN. It comprises 16 74S189 circuits. RAMAE 34 and RAMBE 36 are 8 bit by 16 address location random access memories and store the exponent and mantissa signs of operand # and operand N in both RAMAE 34 and RAMBE 36. Each RAM, RAMAE 34 and RAMBE 36, comprises two 74S189 circuits. The 74S189 circuits are described in "The TTL Databook for Design Engineers", Second Edition, published by Texas Instruments. For the scientific ADD instruction, the exponent and mantissa signs of operand # are selected as the output signals of RAMAE 34, and the exponent and mantissa sign of operand N are selected as the output signals of RAMBE 36.

Both the RAMAE 34 and the RAMBE 36 output signals are coupled to arithmetic logic units ALUE1 38 and ALUE2 40. ALUE1 38 and ALUE2 40 are each made up of two 74S181 circuits. The exponent of SA# is read from RAMAE 34 and is applied to the A input terminal of ALUE1 38 and the B input terminal of ALUE2 40 as output signals RFAE56-62+00. Similarly, the exponent of SAN is read from RAMBE 36 and is applid to the A input terminals of ALUE2 40 and the B input terminals of ALUE1 38 as output signals RFBE56-62+00.

ALUE1 38, by means of an AUDNC-00 signal applied to RAM address logic 48, indicates the operand with the smaller exponent and selects that mantissa to be read from RAMBM 32 and applied to shifter 42. The output signals AUNX56-62+00 and AURX56-62+00 of ALUE1 38 and ALUE2 40 respectively also indicate the magnitude of the difference, which is applied to the shifter 42 to shift the mantissa of the operand with the smaller exponent to the right the number of places required to align the two mantissas for the scientific ADD operation.

MUXs 44 and 46 select the two hexadecimal digits which represent the absolute difference between the exponents in SA# and SAN. ALUE1 38 indicates the difference of the SA# exponent minus the SAN exponent, and ALUE2 40 indicates the difference of the SAN exponent minus the SA# exponent.

A logic signal AUDRCX-00, an output signal of ALUE2 40, is applied to the select terminals of MUXs 44 and 46, and when at logical ZERO, indicates that the operand N exponent is larger than or equal to the operand # exponent. The AURX 55–62 output signals are selected through MUXs 44 and 46 and are applied to shifter 42 by means of output signals SHDDD 1,2,4,8-00 and EXDIF 0-3-00, which indicate the magnitude of the number of hexadecimal digits to be right shifted. The logic signal AUDRCX-00 at logical ONE indicates that the operand # exponent is larger than or equal to the operand N exponent. The AUNX 55–62 outputs are selected through MUXs 44 and 46 for transfer to the shifter 42.

If the SA# mantissa is selected from RAMAM 30, then the SAN mantissa is selected from RAMBM 32 and vice versa. RAM address logic 48 address select signals RFMBA1-00, RFMBA2-00, RFMBA3-00, RFUBX0-00 and RFUBX1-00 select the mantissas of SAN or SA# or RAMAM 32. Address select signals RFMAL1+10, RFMAA2+10, RFMAA3+10, CRRFA0+10 and CRRFA1+10 select the mantissas of SAN or SA# of RAMAM 30.

The output signals RFMB00-55+00 of RAMBM 32 and eight trailing zeroes, which output a MUX 57, are applied to shifter 42 and shifted the number of positions to the right specified by signals EXDIF0-3-00 and SHDDD1,2,4,8-00. The shifter 42 output signals SHDD00-63-00 are applied to the B input terminals of an ALU 50. The output signals RFMA00-23, 25-55-00 and RFMA24,56-63-00 are applied to a junction 85. Signals BUSA00-63-00 are applied to the A terminal of ALU 50 from junction 85. ALU 50 comprises 16 74S181 circuits. The result signals AUOM00-03-00 through AUFM60-63-00 are stored in a register REGR 56. The output signals REGR00-63-00 are applied to the input of RAMAM 30 and RAMBM 32 to be written into the address location defined as SA#. The larger exponent and its mantissa sign are written into SA# of RAMAE 34 and RAMBE 36 through a multiplexer (MUX) 59, a register REGE 58, and a MUX 60 under firmware control.

A normalization cycle is required if the high order hexadecimal digit is a hexadecimal ZERO. Signals AU(0-F)MZO+00 applied to normalize logic 82 from the ALU 50 indicate which of the 16 hexadecimal digits are at hexadecimal ZERO. Normalize logic 82 generates shift signals SHDDD 1,2,4,8-0B, which are applied to the shifter 42. Shifter 42 shifts the operand result read from SA# of RAMBM 32 to place the most significant hexadecimal digit in the high order position of the operand. Signals NRMX56-63+00 are applied to the B input terminal of ALUE1 38 to indicate the number of leading hexadecimal ZEROs in the operand to be normalized. Signals NRMX56-63+00 are subtracted from signals RFAE56-62+00 in ALUE1 38.

Signals AUNX56-62+00, the output of ALUE1 38, as well as mantissa sign signal RFAS63+00, are selected to generate the MUXX56-63+OB exponent signals during the normalization cycle. Signals MUXX56-63+OB indicate the exponent value and mantissa sign of the normalized result and are stored in REGE 58.

The scientific accumulators SA1, SA2, and SA3 are assigned to address locations 5, 6 and 7 respectively of RAMAM 30, RAMBM 32, RAMAE 34, and RAMBE 36.

An output register REGF 62, located from CP 12 by signals FREQ00-15+00, stores signals TASK02+10 and TASK03+10, which define the address location of SA#, and signals TASK14+10 and TASK15+10, which define the address location of SAN of address locations 5, 6 and 7. One of the scientific accumulators SA1, SA2, or SA3 is designated as SA# and one of the remaining scientific accumulators is designated as SAN. A register REGM4 68 stores indications of the word length of the accumulators and the operands transferred from memory (two words of 32 bits or four words of 64 bits). REGM4 68 is loaded from REGD 66 through signals REGD24-31+00.

Signals RFMA24-10 and SHDD24,56-10 are applied to round 84, which applies signals RFMA24,56-63-00 to junction 85. The rounding operation is described in copending related U.S. application Ser. No. 92,907 entitled "Automatic Rounding of Floating Point Operands".

Inverter 31 provides proper polarity of the BUSB00-55+10 input signal to RAMAM 30. Inverter 33 isolates the REGR 56 and REGD66 output signals.

ALU function logic 54 controls the ALU 50 operation. The firmware signals CRSUB+00 and CRADD+00 as well as the mantissa sign signals RFAS63+00 and RSBS+00 indicate the functions the ALU 50 is to perform by means of output signals CRAS 0H-3H-01 and CRAS 0L-3L+01.

Figure 3:
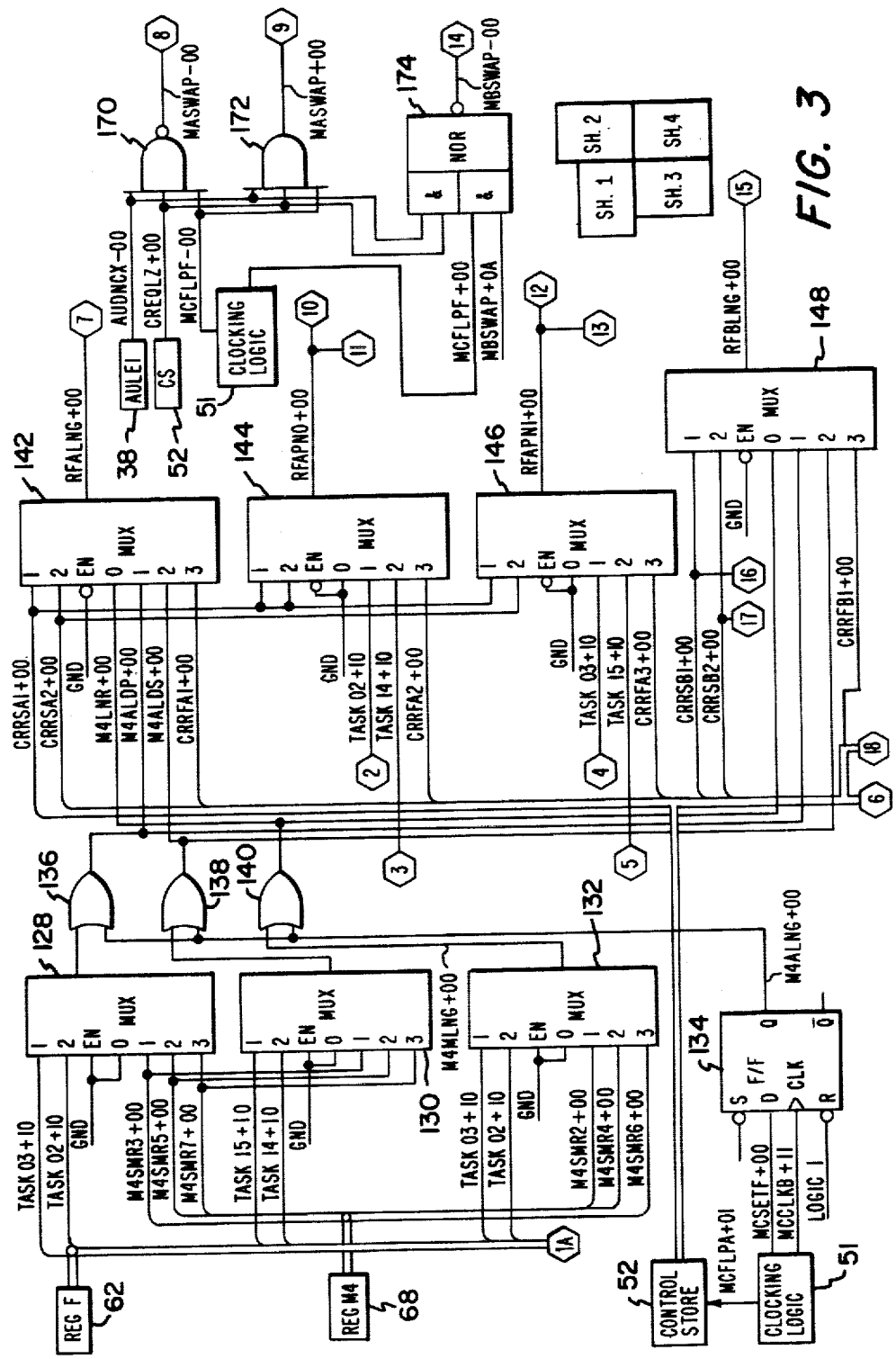
FIG. 3 is a detailed diagram of the addressing logic.
Figure 3:
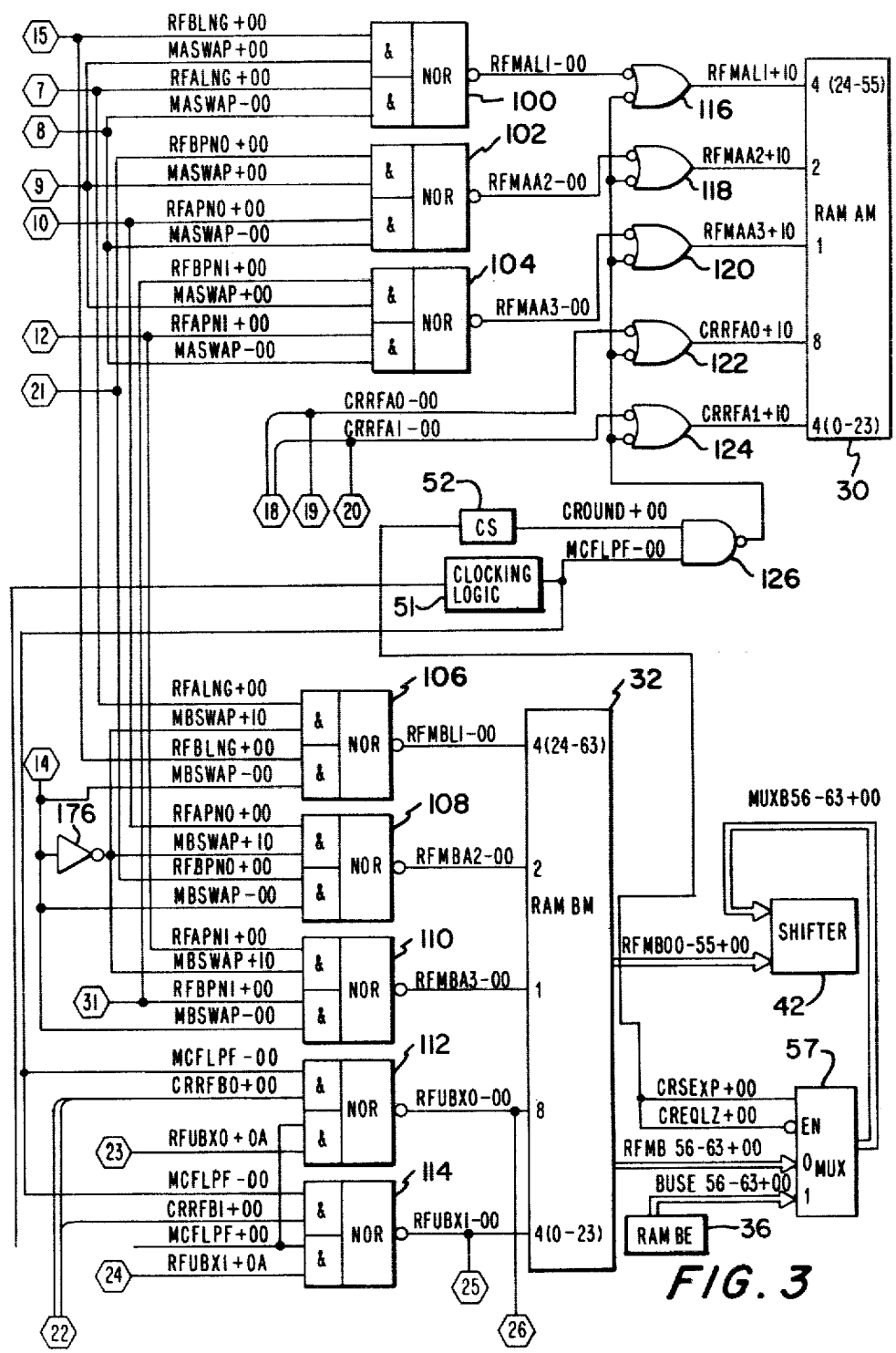
Figure 3:
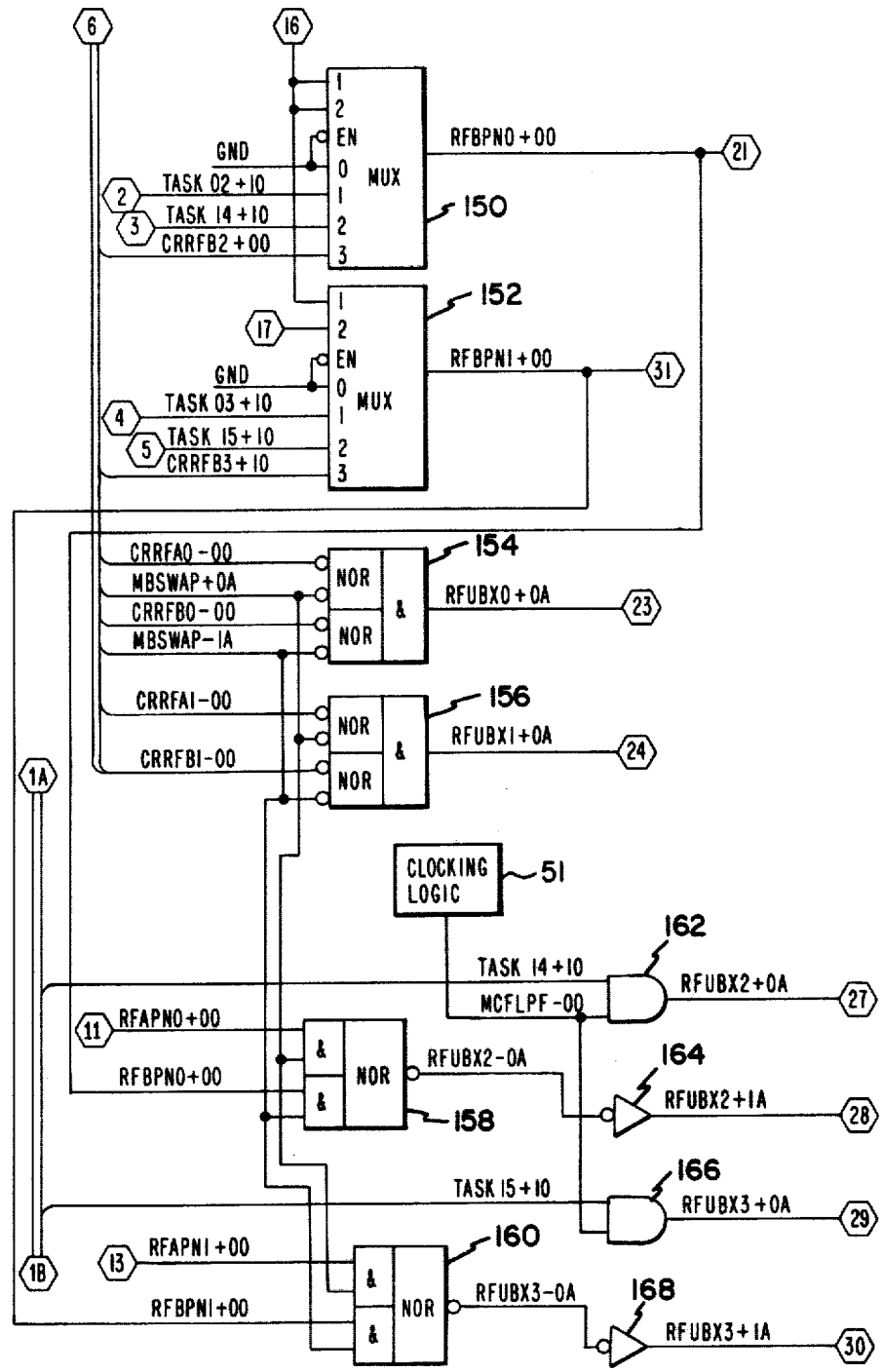
Figure 3:
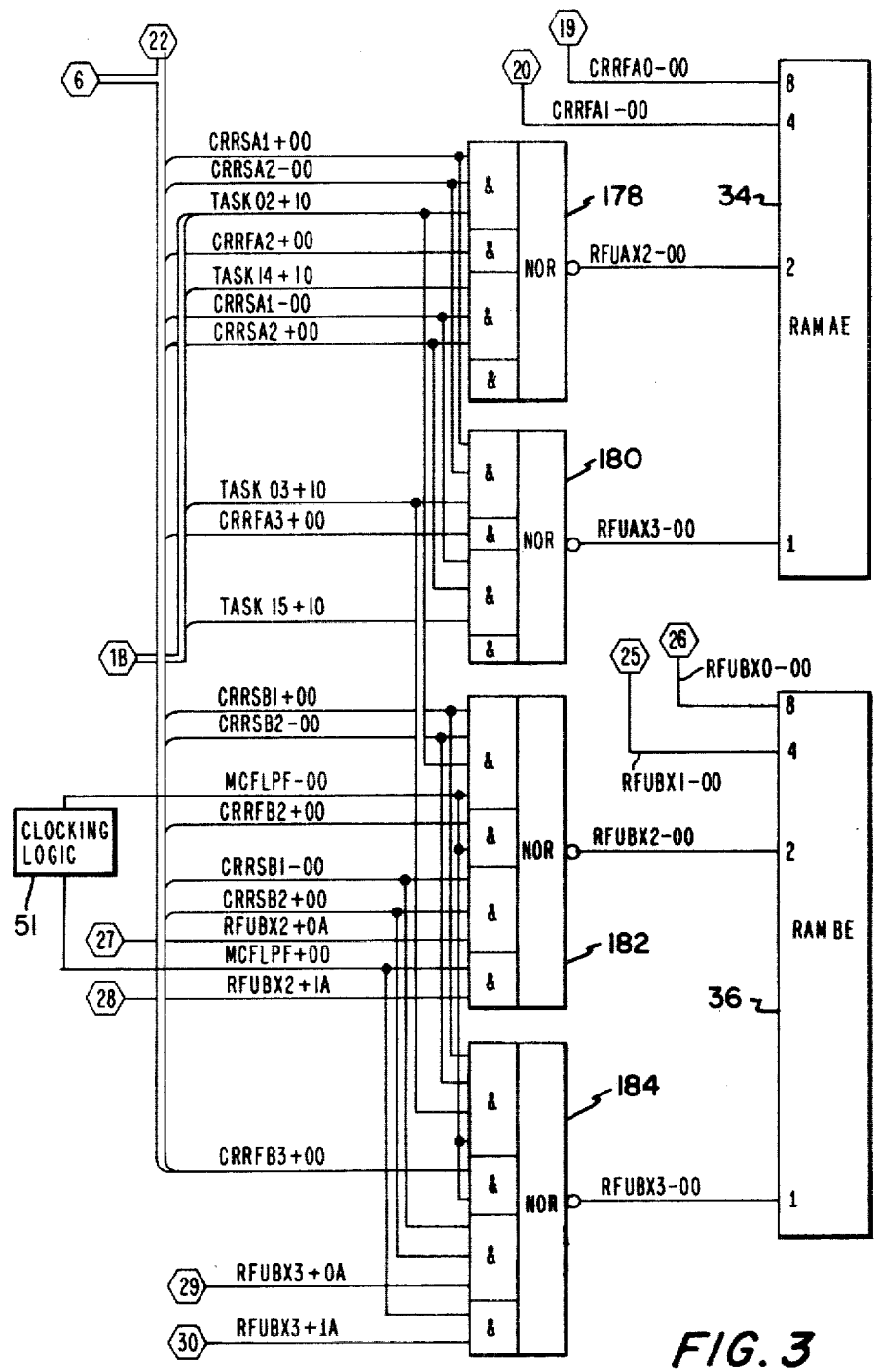

Referring to FIG. 3, output signals TASK02+10 and TASK03+10 of register REGF 62 identify the address location of SA# and output signals TASK14+10 and TASK15+10 identify the address location of SAN or RAMAM 30, RAMBM 32, RAMAE 34, and RAMBE 36.

Output signals M4SMR3+00, M4SMR5+00 and M4SMR7+00 indicate the length of the operand stored in SA1, SA2, and SA3 respectively. A multiplexer (MUX) 128 provides an output signal at logical ONE to indicate a four word operand for SA#. Similarly, a MUX 130 indicates the operand length for SAN.

Output signals M4SMR2+00, M4SMR4+00, and M4SMR6+00 at logical ONE indicate that the length of the memory 4 data field associated with SA1, SA2 and SA3 respectively is four words, and when at logical ZERO, two words. These signals are applied to MUX 132 which indicates the memory 4 data field length. The output of MUXs 128, 130 and 132 are applied to inputs of OR gates 136, 138 and 140 respectively. Memory operations are not a part of the invention and are not further described.

Multiplexers 142, 144 and 146 generate output signals RFALNG+00, RFAPN0+00 and RFAPN1+00 under control of firmware signals CRRSA1+00 and CRRSA2+00 from control store 52. Signal RFALNG+00 at logical ONE indicates a four word operand in memory 4. Signal M4LNR+00, at logical ONE, applied to the input terminal 0 of MUX 142 indicates that the memory 4 word associated with SA# is a four word operand. Signal M4ALDP+00, at logical ONE, applied to input terminal 1 of MUX 142 indicates that SA# is a four word operand. The signal M4ALDS+00, at logical ONE, applied to input terminal 2 of MUX 142 indicates that SAN is a four word operand. The signal CRRFA1+00 applied to input terminal 3 permits firmware control of the length address signal RFALNG+00. MUX 148 controls length address signal RFBLNG+00 in a manner similar to the control of signal RFALNG+00 by MUX 142.

Output signals RFAPN0+00 and RFAPN1+00 indicate, under firmware control, the SA# address location when the input terminals 1 of MUXs 144 and 146 are selected, and the SAN address location when the input terminals 2 are selected. Input terminals 3 are controlled by firmware signals CRRFA2+00 and CRRFA3+00 respectively. Firmware signals are generated at MCFLPA+01 time in control store 52.

Output signals RFBLNG+00, RFBPN0+00, and RFBPN1+00 of MUXs 148, 150 and 152 are controlled in a similar manner to output signals RFALNG+00, RFAPN0+00, and RFAPN1+00.

A flop 134 is operative during the cycle in which the result is read out by REGR 56, FIG. 2, to SA# in RAMAM 30 and RAMBM 32, and forces a four word write. Output signal M4ALNG+00 is applied to the inputs of OR gates 136, 138 and 140.

Signals RFALNG+00 and RFBLNG+00 are applied to the inputs of AND/NOR gates 100 and 106. Signals RFAPN0+00 and RFBPN0+00 are applied to the inputs of AND/NOR gates 102 and 108. Signals RFAPN1+00 and RFBPN1+00 are applied to the inputs of AND/NOR gates 104 and 110.

The mantissa of the operand having the smaller exponent is read from RAMBM 32 to shifter 42, FIG. 2. The exponent of SA# is read from RAMAE 34, FIG. 2, into the A input terminal of ALUE1 38, and the exponent of SAN is read from RAMBE 34 into the B input terminal of ALUE1 38. The output signal AUDNCX-00 from ALUE1 38 at logical ONE indicates that the exponent of SA# is smaller than the exponent of SAN. In that case, the mantissa of SA# is read from RAMBM 32 and the mantissa of SAN is read from RAMAM 30. If the exponent of SAN were smaller than the exponent of SA#, then the mantissa of SAN would be read from RAMBM 32 and the mantissa of SA# would be read from RAMAM 30.

Referring to FIG. 3, signal AUDNCX-00 is applied to the input of a NAND gate 170, an AND gate 172 and an AND/NOR gate 174. Firmware signal CREQLZ+00 is at logical ONE for this equalization operation. Signal MCFLPF-00 is at logical ONE since this is not a transfer from a REGR 56, FIG. 2, operation. Therefore, signal MASWAP+00, the output of AND gate 172, is at logical ONE and signal MASWAP-00, the output of NAND gate 170, is at logical ZERO. Also, the output of AND/NOR gate 174, signal MBSWAP-00 is at logical ONE and signal MBSWAP+10, the output of an inverter 176, is at logical ZERO. Therefore, the address signals RFBLNG+00, RFBPN0+00, and RFBPN1+00, which normally control the address selection of RAMBM 32, control the address selection of RAMAM 30 and address signals RFALNG+00, RFAPN0+00, and RFAPN1+00, which normally control the address selection of RAMAM 30, control the address selection of RAMBM 32.

The inputs to AND/NOR gates 154 and 156, signals CRRFA0-00, CRRFA1-00, CRRFB0-00 and CRRFB1-00, are operative under firmware control to generate output signals RFUBX0+0A and RFUBX-1+0A, which are applied to the inputs of AND/NOR gates 112 and 114 respectively. Logic signal MCFLPF+00 is at logical ONE during the register REGR 56 transfer of data to RAMAM 30 and RAMBM 32. Timing signals MCCLKB+11, MCSETF+00, MCFLPF+00 and MCFLPF-00 are generated as clocking logic 51.

Firmware signals CRRFB0+00 and CRRFB1+00 are applied to the AND/NOR gates 112 and 114 respectively. Signal MCFLPF-00 is at logical ONE during the readout of the mantissas, thereby generating the RFUBX0-00 output signal of AND/NOR gate 112, which is applied to input terminal 8 of RAMBM 32, and the RFUBX1-00 output signal of AND/NOR gate 114, which is applied to input terminal 4 of RAMBM 32, bit positions 00-23.

During the equalization operation, that is, when the mantissa swap may take place, the address signals CRRFA0+10 and CRRFA1+10 applied to RAMAM 30 are controlled by the firmware, as are the address signals RFUBX0-00 and RFUBX1-00 applied to RAMBM 32.

Output signals RFMAL1-00, RFMAA2-00 and RFMAA3-00 of AND/NOR gates 100, 102 and 104 respectively are applied to the inputs of NOR gates 116, 118 and 120. The output signal RFMAL1+10 of NOR gate 116 is applied to input terminal 4 of RAMAM 30, storing mantissa bits 24 through 55, that is, the long operand words. Output signals RFMAA2+10 and RFMAA3+10 are applied to input terminals 2 and 1 respectively of RAMAM 30. Firmware signals CRRFA0-00 and CRRFA1-00 are applied to the inputs of NOR gates 122 and 124 respectively. The output signal CRRFA0+10 is applied to input terminal 8 of RAMAM 30 and the output signal CRRFA1+10 is applied to input terminal 4 of RAMAM 30, bit positions 00 through 23. NAND gate 126 is operative during the rounding operation to select address location 15 of RAMAM 30 by means of control signal CROUND+00 and timing signal MCFLPF-00 for forcing ZEROs in that location.

Output signals RFMBL1-00, RFMBA2-00 and RFMBA3-00 of AND/NOR gates 106, 108 and 110 respectively are operative with RAMBM 32 and output signals RFMAL1+10, RFMAA2+10 and RFMAA3+10 of AND/NOR gates 100, 102 and 104 respectively are operative with RAMAM 30 through NOR gates 116, 118 and 120.

An AND/NOR gate 178 generates an output signal RFUAX2-00 which is applied to input terminal 2 of RAMAE 34 and an AND/NOR gate 180 generates an output signal RFUAX3-00 which is applied to input terminal 1 of RAMAE 34. For the scientific ADD instruction, the TASK02+10 and the TASK03+10 signals and the firmware signals CRRSA1+00 and CRRSA2-00, applied to the inputs of AND/NOR gates 178 and 180, select the SA# address location of the exponent stored in RAMAE 34. Firmware signals CRRFA2+00 and CRRFA3+00 also control the selection of the exponent stored in RAMAE 34.

An AND/NOR gate 182 generates an output signal RFUBX2-00 which is applied to input terminal 2 of RAMBE 36 and an AND/NOR gate 184 generates an output signal RFUBX3-00 which is applied to input terminal 1 of RAMBE 36. Signals RFUBX1-00 and RFUBX0-00 are applied to input terminals 4 and 8 respectively of RAMBE 36.

During the readout of RAMBE 36, the TASK14+10 and TASK15+10 signals are applied to the inputs of AND gates 162 and 166, thereby generating output signals RFUBX2+0A and RFUBX3+0A when timing signal MCFLPF-00 is at logical ONE, thereby selecting the address location of SAN. During the write result operation, AND/NOR gates 158 and 160 generate output signals RFUBX2-0A and RFUBX3-0A which are inverted through inverters 164 and 168 to develop the SA# address location in RAMBE 36 in conjunction with signals RFUBX0-00 and RFUBX1-00.

MUX 57 is enabled by the CREQLZ+00 signal at logical ZERO. During the mantissa equalization operation, MUX 57 is disabled thereby forcing signals MUXB56-63+00 to logical ZERO. MUX 57 is enabled to transfer the exponent to the shifter 42 from RAMBM 32 or RAMBE 36 by control signal CRSEXP+00.

In summary, referring to FIG. 2, the exponent in address location SA# is read out of RAMAE 34 and the exponent in address location SAN is read out of RAMBE 36 and compared in ALUE1 38. The mantissa having the smaller exponent is read out of the address location in RAMBM 32 into shifter 42. The mantissa having the larger exponent is read out of RAMAM 30 into ALU50.

The difference between the SA# exponent stored in the RAMAE 34 and the SAN exponent stored in RAMBE 36 is applied to the shifter 42 and indicates the number of hexadecimal digits the smaller mantissa is shifted to the right. The shifted mantissa is applied to the ALU50 and the result is stored in REGR 56 from which it is transferred in SA# address location of RAMAM 30 and RAMBM 32.

The larger exponent with its mantissa sign is stored in the SA# address location of RAMAE 34 and RAMBE 36. This is selected by MUX 59 by the AUDNCX-00 signal and stored in REGE 58 for transfer to RAMAE 34 and RAMBE 36.

If the exponents in address locations SA# and SAN of RAMAE 34 and RAMBE 36 are equal, then the output signal AUDNCX-00 is at logical ZERO. The mantissa in address location SA# is read out of RAMAM 30 and the mantissa in address location SAN is read out of RAMBM 32.

If the mantissa signs are alike, the mantissas are added in ALU50, FIG. 2. If the mantissa signs are not alike, the B mantissa input to ALU50 is subtracted from the A mantissa input. The arithmetic operation is controlled by function control 54 by means of signals CRAS0H-3H+01 and CRAS0L-3L+01.

If the result in REGR 56 is in the complement form, then another pass through the ALU 50 is required for recomplementing the mantissa and correcting the sign. The operation is not shown since it is not necessary to describe the invention.

Figure 4:
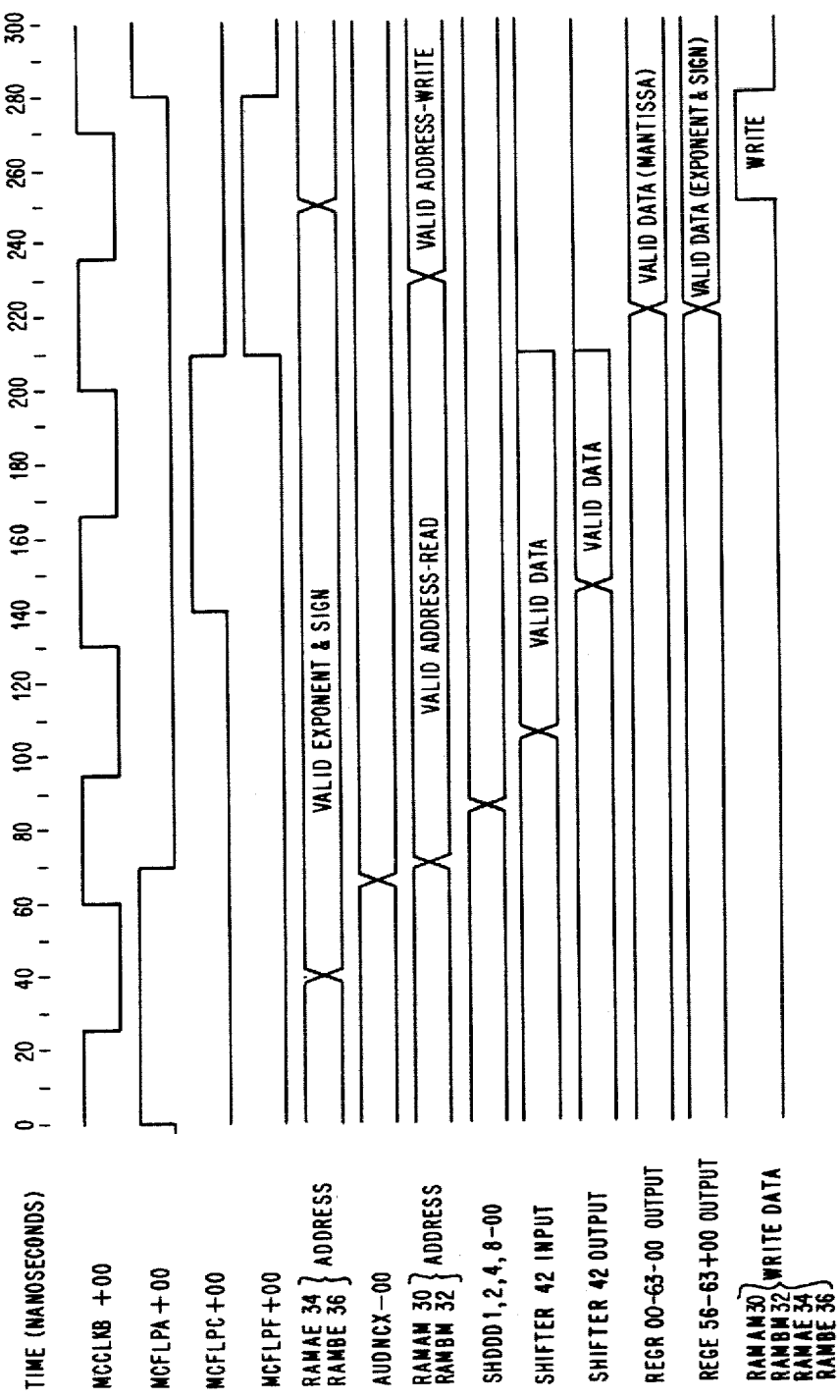
FIG. 4 is a timing diagram of the scientific ADD operation.

Referring to FIG. 4, clock signal MCCLKB+00 is at logical ONE for 35 nanoseconds and at logical ZERO for 35 nanoseconds. Clock signal MCCLKB+00 generates the clock signals MCFLPA+00, MCFLPC+00 and MCFLPF+00. The clock signals are generated by clocking logic 51, FIG. 3.

The exponent and mantissa sign are available at the output of RAMAE 34 and RAMBE 36 approximately 40 nanoseconds after the rise of the MCFLPA+00 clock signal. These signals are applied to the input of ALUE1 38 and ALUE2 40 and the output signal of ALUE1 38, AUDNCX-00, is available approximately 65 nanoseconds after the rise of the MCFLPA+00 clock signal. The address location selection signals of RAMAM 30 and RAMBM 32 are available approximately 70 nanoseconds after the rise of the MCFLPA+00 clock signal and the data is available at the input of shifter 42, approximately 105 nanoseconds after the rise of the MCFLPA+00 clock signal. The signals indicating the number of hexadecimal digits as the mantissa with the smaller exponent, SHDDD 1,2,4,8-00 are available at the shifter 42, approximately 85 nanoseconds after the rise of MCFLPA+00 clock signal. The mantissa is available from the shifter 42 output approximately 145 nanoseconds after the rise of the MCFLPA+00 clock signal.

The mantissa output signals REGR00-63-00 and the exponent and mantissa sign signals REGE56-63+00 are available approximately 10 nanoseconds after the fall of the MCFLPC+00 clock signal and are written into RAMAM 30, RAMBM 32, RAMAE 34, and RAMBE 36, approximately 40 nanoseconds after the rise of the MCFLPF+00 clock signal. The valid write address of RAMAM 30 and RAMBM 32 is available approximately 20 nanoseconds after the rise of the MCFLPF+00 clock signal.

FIG. 5 shows the bit configuration of register REGM4 68. Bit position 0 indicates a rounding operation if at logical ONE or a truncate operation if at logical ZERO. Bit positions 3, 5 and 7 indicate the length of the contents of the scientific accumulators 1, 2 and 3 respectively. Bit positions 2, 4 and 6 indicate the length of the memory operand associated with scientific accumulators 1, 2 and 3 respectively. The memory operand for the current instruction is stored in address location 4 of RAMAM 30 and RAMBM 32. The bit positions are identified as signals M4SMR0, 2-7+00 in FIG. 3 and the specification. Signals M4SMR 2-7+00 indicate 2 word operands when at logical ZERO and 4 word operands when at logical ONE.

Referring to FIG. 6, the contents of the first 8 address locations of RAMAM 30 and RAMBM 32 are shown. Bit positions 0-23 of RAMAM 30 and RAMBM 32 store the upper two words of the operand (ACC1UA, ACC2UA, ACC3UA, MEMUA, ACC1UB, ACC2UB, ACC3UB and MEMUB) and bit positions 24 through 55 store the lower two words of the operand (ACC1LA, ACC2LA, ACC3LA, MEMLA, ACC1LB, ACC2LB, ACC3LB and MEMLB). Bit positions 56–63 of RAMBM 32 store the guard digits G1 and G2. Information is stored in the guard digit positions as the result of a floating point arithmetic operation. The shifted result is stored back into RAMBM 32. Address locations 5, 6 and 7 store the contents of scientific accumulators 1, 2 and 3 respectively. Address location 4 stores the memory operand, that is, the operand that is processed with the selected scientific accumulator during a scientific instruction operation.

Bit positions 24 through 55 of address locations 0 through 3 of RAMAM 30 and RAMBM 32 are binary ZERO, as are bit positions 55 through 63 of RAMBM 32. Operands called for in scientific instructions are stored in address locations 4 through 7.

When a result requires normalizing, rounding, complementing or overflow shifting, the result is read from address locations 5, 6 or 7 of RAMBM 32. This result will include the 64 binary bits, the upper 2 words, the lower 2 words and the 2 guard digits.

When the RAMAM 30 is addressed for a 2 word operand stored for example, in address location 5, as indicated by a binary ZERO stored in position 2 of register REGM4 68, FIG. 5, bit positions 0 through 23 are selected from address location 5 and bit positions 24 through 56 are selected from address location 1. If address location 5 stored a 4 word operand as indicated by a binary ONE stored in position 2 of register REGM4 68, FIG. 5, then bit positions 0 through 55 of address location 5 are selected.

RAMBM 32 operates in a similar manner. A 2 word operand in address location 7, as indicated by a binary ZERO stored in bit position 7 of register REGM4 68, FIG. 5, for example, would be read out of bit positions 0 through 23 of address location 7 and bit positions 24 through 63 of address location 3. A 4 word operand in address location 7 would be read out of bit positions 0 through 63; however, the information in bit positions 56 through 63 is forced to binary ZERO.

Referring to FIG. 3, assuming address location 5 is selected under firmware control, signal RFAPN1+00, the output of MUX 146, is at logical ONE, thereby forcing RAMAM 30 address signal RFMAA3+10 to logical ONE through AND/NOR gate 104 and NOR gate 120. For a 4 word operand, the output of MUX 142, signal RFALNG+00, is at logical ONE, thereby forcing RAMAM 30 address signal RFMAL1+10 to logical ONE. This selects address location 5 for bit positions 24 through 55. For a 2 word operand, signal RFMAL1+10 is at logical ZERO, thereby selecting bit positions 24 through 55 of address location 1. Bit positions 0 through 23 of address location 5 are selected since signal CRRFA1+10 is controlled by the firmware.

Signal M4SMR3+00, M4SMR5+00 and M4SMR7+00 are applied to the input terminals of MUXs 128 and 130 to indicate the length of scientific accumulators 1, 2 and 3 respectively.

The length of the MEM operand of FIG. 5 in address location 4 is defined by the signals M4SMR2+00, M4SMR4+00 or M4SMR6+00 respectively in accordance with the scientific accumulator associated with the memory operand. The output signal M4MLNG+00 of MUX 132 defines the length of the operand stored in address location 4. For a 2 word operand, output signal M4MLNG+00 is at logical ZERO forcing the output of MUX 142, signal RFALNG+00, to logical ZERO. In this case, the firmware signals CRRSA1+00 and CRRSA2+00 select input terminal 0 of MUX 142. This would force signal RFMAL1+10 to logical ZERO. The firmware signal CRRFA1+10 at logical ONE results in address location 4 of RAMAM 30 being selected for the readout of bits 0 through 23 and address 0 being selected for the readout of bits 24 through 55.

Signal M4MLNG+00, the output of MUX 132, at logical ONE indicating a 4 word operand results in bits 0 through 55 of address location 4 being read out.

The output of MUX 148, signal RFBLNG+00, operates in a similar manner as signal RFALNG+00 to control signal RFMBL1-00. For a 2 word memory operand, RFMBL1-00 is at logical ONE and signal RFUBX1-00 is at logical ZERO thereby selecting RAMBM 32 address location 0, bit positions 24 through 63 and address location 4, bit positions 0 through 23. For a 4 word memory operand, signals RFMBL1-00 and RFUBX1-00 are at logical ZERO thereby selecting address location 4, bit positions 0 through 63.

A multiplexer 57 applies the guard digits RFMB56-63+00 at logical ZERO to the shifter 42. The operand is read from RAMBM 32 during the equalization cycle of the processing of the floating point instruction. Enable signal CREQLZ+00 at logical ONE disables MUX 57 thereby applying logical ZEROs to guard digit signals MUXB56-63+00. Control store signal CRSEXP+00 is not operative during this operation.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A processing system comprising:
a random access memory having a first and second plurality of address locations, each having an upper portion and a lower portion for storing operand mantissas in said first plurality of address locations and for storing binary ZERO bits in said lower portion of said second plurality of address locations;
register means for generating a plurality of length signals indicative of the length of each of said operand mantissas; and
addressing means coupled to said register means and said random access memory being responsive to one of said plurality of length signals in a first state for selecting one of said operand mantissas from said upper and said lower portions of one of said first plurality of address locations, and being responsive to said one of said plurality of length signals in a second state for selecting said one of said operand mantissas from said upper portion of said one of said first plurality of address locations and said lower portion of a corresponding one of said second plurality of address locations for transfer of said operand mantissas to an output.

2. The processing system of claim 1 wherein said random access memory has said corresponding one of said second plurality of address locations for each of said first plurality of address locations.

3. The processing system of claim 2 wherein said addressing means comprises:
multiplexer means coupled to said register means and responsive to a plurality of task signals for selecting said one of said plurality of length signals in said first state for generating a long signal in a first state for selecting said upper and said lower portions of said one of said first plurality of address locations defined by said plurality of task signals, and selecting said one of said plurality of length signals in said second state for generating said long signal in said second state for selecting said upper portion of said one of said first plurality of address locations and said lower portion of said corresponding one of said second plurality of address locations.

4. The processing system of claim 3 wherein said multiplexer means comprises:
a first multiplexer coupled to said register means and responsive to a first and a second of said plurality of task signals for selecting said one of said plurality of length signals of a first accumulator for generating a first length signal;
a second multiplexer coupled to said register means and responsive to a third and a fourth of said plurality of task signals for selecting said one of said plurality of length signals of a second accumulator for generating a second length signal;
a third multiplexer coupled to said register means and responsive to said first and said second task signals for selecting said one of said plurality of length signals of a memory length associated with said first accumulator for generating a third signal; and
a fourth multiplexer coupled to said first, said second, and said third multiplexers and responsive to a first and a second control signal for selecting said first, said second or said third length signal or a third control signal for generating said long signal for indicating the length of said first or said second accumulator or said memory length associated with said first accumulator.

5. The processing system of claim 4 wherein said plurality of length signals in said first state indicates a four word operand mantissa and in said second state indicates a two word mantissa.

6. The processing system of claim 5 wherein said first accumulator is identified as SA# and said second accumulator is identified as SAN.

* * * * *